United States Patent [19]

Stern

[11] Patent Number: 5,260,884
[45] Date of Patent: Nov. 9, 1993

[54] BRIEF CASE HAVING INTEGRAL COMPUTER

[76] Inventor: Jonathan Stern, 46 Longwood Ave., Brookline, Mass. 02146

[21] Appl. No.: 731,798

[22] Filed: Jul. 17, 1991

[51] Int. Cl.$^5$ .............................................. G06F 1/00
[52] U.S. Cl. ................... 364/708.1; 361/680; 361/685
[58] Field of Search .................. 364/708, 709.01, 551; 361/394, 395, 380; 340/710

[56] References Cited

U.S. PATENT DOCUMENTS

| | | | |
|---|---|---|---|
| 3,352,390 | 11/1967 | Zalkind | 150/1.6 |
| 4,132,295 | 1/1979 | Hochfelsen | 190/60 |
| 4,482,133 | 6/1989 | LaBarge et al. | 206/315.1 |
| 4,736,332 | 4/1988 | Crease | 364/708 |
| 4,790,417 | 12/1988 | Tomikawa et al. | 190/102 |
| 4,803,652 | 2/1989 | Maeser | 364/708 |
| 4,809,200 | 2/1989 | Moore et al. | 364/551 |
| 4,837,590 | 6/1989 | Sprague | 364/708 |
| 4,851,812 | 7/1989 | Holmberg | 364/708 |
| 4,929,948 | 5/1990 | Holmberg | 364/708 |
| 5,021,922 | 6/1991 | Davis et al. | 361/394 X |
| 5,034,858 | 7/1991 | Kawamoto et al. | 364/708 |
| 5,049,863 | 9/1991 | Oka | 340/710 |

FOREIGN PATENT DOCUMENTS

| | | | |
|---|---|---|---|
| 60-160418 | 8/1985 | Japan | 364/708 |
| 62-31464 | 2/1987 | Japan . | |

*Primary Examiner*—Long T. Nguyen
*Attorney, Agent, or Firm*—George W. Neuner

[57] ABSTRACT

A brief case contains as an integral part thereof a functional computer. The brief case has (A) space for carrying documents, tablets, business articles, small books, or conventional brief case articles, (B) fixedly positioned therein computer components including a computer motherboard, a disk drive and a power supply, and (C) a movably mounted keyboard. The video screen and the keyboard are preferably positioned adjacent one panel of the brief case.

20 Claims, 4 Drawing Sheets

BRIEF CASE HAVING INTEGRAL COMPUTER

The present invention relates to laptop computers, particularly a brief case having an integral computer, i.e. a brief case computer. The brief case of the invention continues to maintain the function of a brief case, i.e., it has space to carry papers, small books and instruments, etc.

BACKGROUND OF THE INVENTION

Portable computers have become extremely popular. They provide desktop compatible computing power in a portable lightweight packaging. There are three competing design criteria: size, weight and computing power. To enhance portability the size and weight are reduced. However, this shrinks the size of the keyboard, making it awkward to use, and the small size of the screen strains the eyes. In addition, smaller size historically has confined the computing power and hampered expandability.

Three major packaging designs currently prevail: the laptop, the lunch box and the notebook. The laptop has been the most popular with the screen folding over the keyboard to create a closed box. In some of the laptop designs, once the screen is raised, the keyboard can be removed from its bay for increased convenience. Most laptops in this category weigh about 12-16 pounds and have computing power comparable to desktop machines, e.g., 286, 386SX or 386 microprocessor with 1 MB of memory expandable to 4-8 MB, 20-100 MB hard disk drive, a VGA screen, etc.

The second design, the lunchbox, looks like a small sewing machine with the screen on one of its wide faces, protected by the keyboard. When in use, the keyboard is unhooked, exposing the screen. This design is usually heavier and bulkier than the clamshell and is used for souped-up machines. It is not technically a laptop, but is a portable computer.

The third design is the notebook computer which is a shrunk down version of the laptop design. These new machines are so small that they easily fit into a briefcase, occupying only half of its space, and are very light weighing only 4-6 pounds. However, their keyboard is awkward to use because of its small size and they historically have had to sacrifice power to fit within the typical 8.5 inch×11 inch×1.5 inch shell.

However, present portable computers still suffer from various deficiencies. The laptop and lunchbox designs are separate distinct packages that must be carried in addition to a brief case. The notebook computer is small enough to fit into a brief case but suffers from the necessity for a small video screen and a small keyboard. Further, it is a separate package and must be placed in the brief case.

It would be desirable and useful to have a portable computer having a full size keyboard and a sufficiently large screen but not requiring a separate package from the brief case so that papers, books and other standard brief case items could be conveniently carried with the computer in one package.

SUMMARY OF THE INVENTION

The present invention provides a novel solution to the aforementioned problem. The invention provides a brief case having an integral computer and having space for papers, books and other traditional contents of a brief case, wherein the computer includes a sufficiently large screen, a traditional size keyboard, disk drive, power supply and a motherboard having a processor, memory and video and disk controllers. The screen and a removable keyboard are located along one panel of the brief case. The batteries to provide a source of power and disk drive are located in a protective shell within the brief case to provide stability to the brief case when the computer is being used. The motherboard may be located along the same wall as the screen or may be located with the power supply and disk. Most of the volume of the brief case remains open for carrying traditional brief case articles.

Thus, the present invention provides the functions of a computer and a brief case in one package.

DETAILED DESCRIPTION OF THE INVENTION

Figure 1:
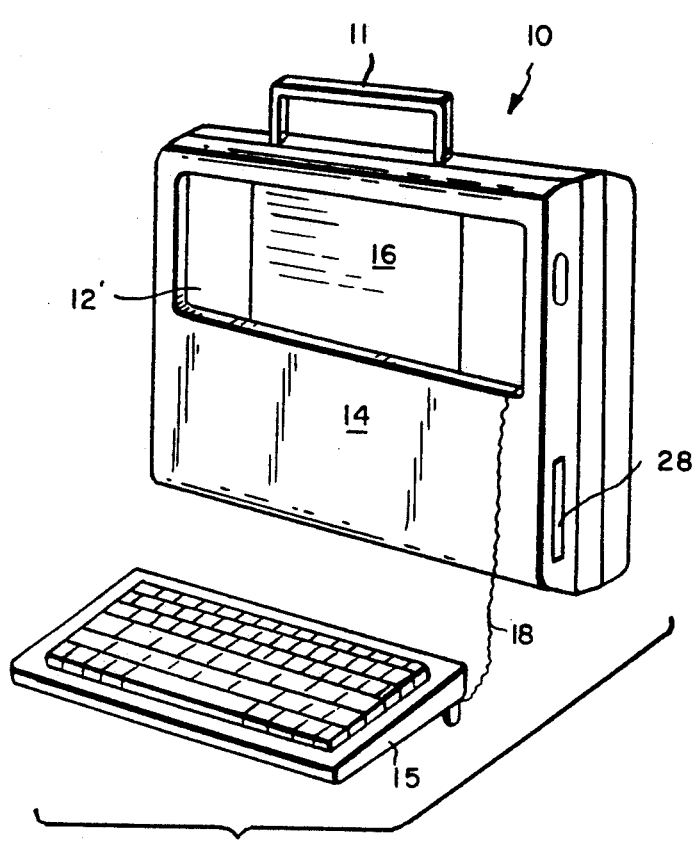
FIG. 1 is a perspective view of one embodiment of the invention showing a conventional size brief case, from which a traditional size keyboard has been removed from one panel thereof.

The invention will now be described in detail, including the preferred embodiments thereof. FIG. 1 illustrates one preferred embodiment of the invention which comprises a conventional size brief case 10 with handle 11 having an opening 12 in one panel 14, e.g., the bottom panel of the brief case. The opening is of a size sufficient to removably hold a conventional size computer keyboard 15, which is shown (in FIG. 1) removed from the panel 14 in a position for operation of the computer. Through the opening in the panel can be seen a computer screen 16 of comparable size to a laptop computer or larger without comprising portability.

For purposes of this invention and specification, a conventional size keyboard is one having a set of about a 101 keys or a keyboard having about 84 keys and a mouse or other pointing device, each key being on the order of about 0.625 inch to about 0.675 inch across. The conventional screen used in this invention is typically a liquid crystal display (LCD) screen having dimensions at least about 8 inch×6 inch. Also, for purposes of this specification, a conventional brief case is structurally described as having two large panels spaced apart by four side walls, thereby defining the enclosed space of the brief case.

Figure 3:
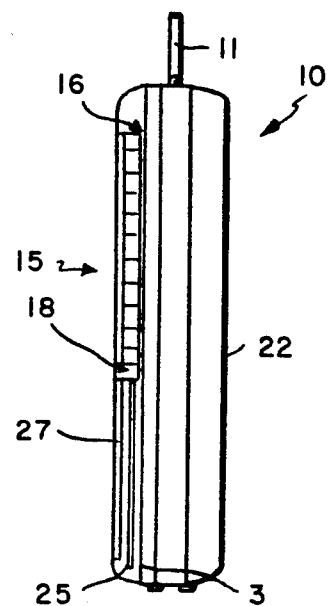
FIG. 3 is a side view of the brief case of FIG. 1 with the keyboard removably stored in one wall thereof.
Figure 2:
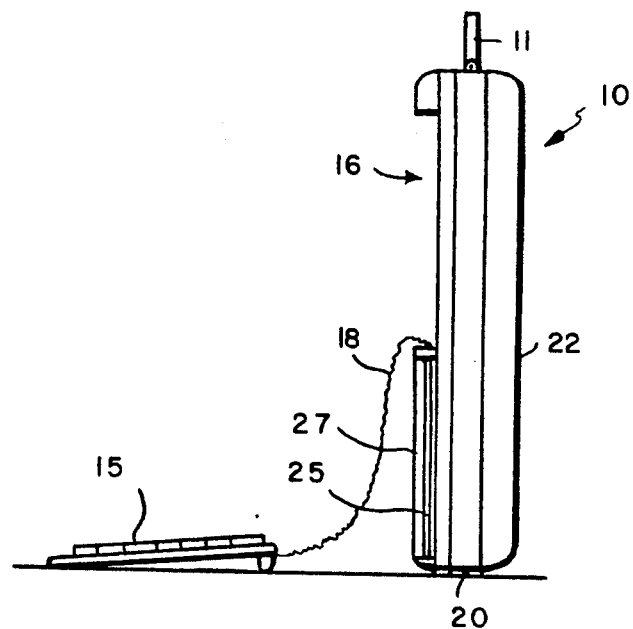
FIG. 2 is a side view of the brief case and keyboard of FIG. 1.

As shown in FIG. 2 and FIG. 3, the brief case is resting on its hinged side 20 with the bottom panel 22 to the right. To open the brief case 10, one would normally place the bottom panel 22 on a surface and open the latch to use or remove documents or other contents. In this embodiment, the keyboard, 15, the screen 16, the motherboard 25, and the disk drive in compartment 27 are located in the bottom portion 14 of the brief case. Cable 18 connects the keyboard to the motherboard.

The motherboard typically includes a processing unit (or cpu), memory, a disk controller, a video controller and one or more input/output ports. The components of the motherboard can be located on one or more boards for convenience.

The source of power (not shown), typically a battery or set of batteries is preferably located in a protected compartment positioned inside the brief case 10 along the hinged side 20 to stabilize the brief case during use of the computer Preferably, the power supply also include a connection (not shown) for charging the battery and/or for operating the computer using a conventional 110 V a.c. power supply. Most preferably, the connection for the external power source is located on the exterior of the brief case near edge 20 and has a cover (not shown). Location and installation of the connection is readily accomplished by any skilled mechanic. An electrical power cord can conveniently be stored in the brief case in a preselected location arranged and structured specifically to hold the power cord.

In a preferred embodiment, the brief case 10 has both a hard disk drive and a floppy disk drive located adjacent each other in compartment 27. An opening 28 is provided in the side of the brief case for insertion and removal of the floppy disk.

Alternatively, the keyboard could be made part of the top panel 22 of the brief case with the video screen located behind it and a suitable divider separating the screen and any other computer components located adjacent the bottom panel from the storage space for conventional brief case items. Other alternative arrangements can also be used for specific brief case designs.

Figure 4:
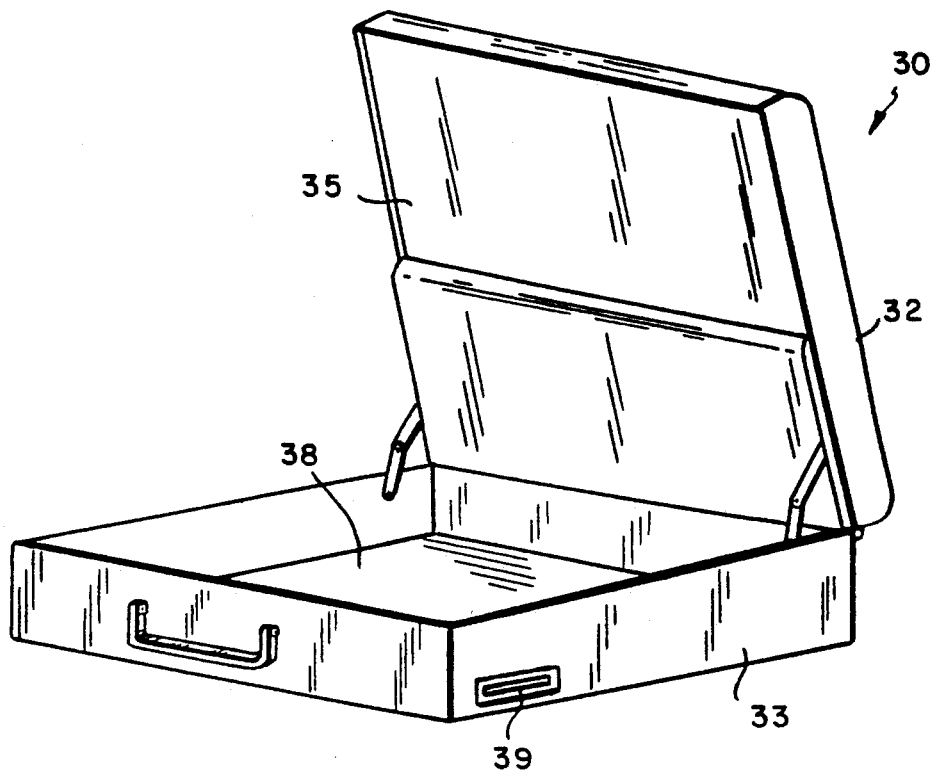
FIG. 4 is a perspective view of another embodiment of the invention showing an open conventional size brief case with compartment for video screen and keyboard closed.

Another preferred embodiment of the invention is illustrated in FIGS. 4 through 7. In FIG. 4, a conventional size brief case 30 is shown in the open position. Located behind divider 35 are a screen, computer keyboard and other components in the top portion 32 of the brief case. In this position, the brief case 30 is used to store and access the conventional contents of the brief case such as papers, business supplies including tablets and instruments, small books, and various business or other articles, etc., which are stored in the space 38, which is primarily located in the bottom portion 33 of the brief case, as shown (FIG. 4).

Figure 5:
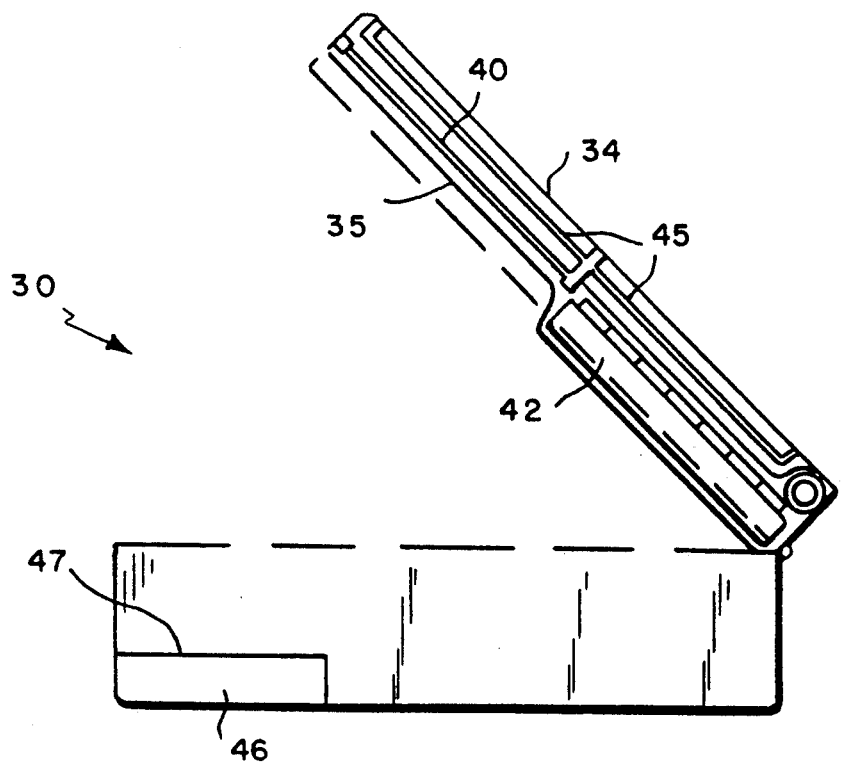
FIG. 5 is a side view of the brief case of FIG. 4, partially in section, illustrating the arrangement of the computer components with the compartment closed.
Figure 6:
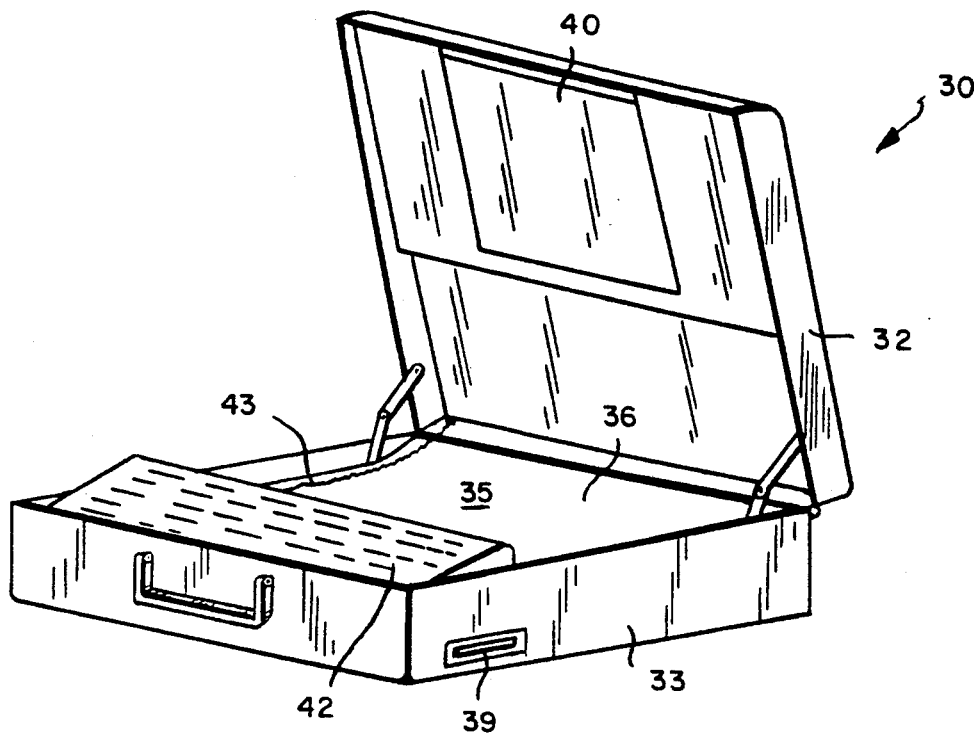
FIG. 6 is another perspective view of the brief case of FIG. 4 illustrating the compartment open.
Figure 7:
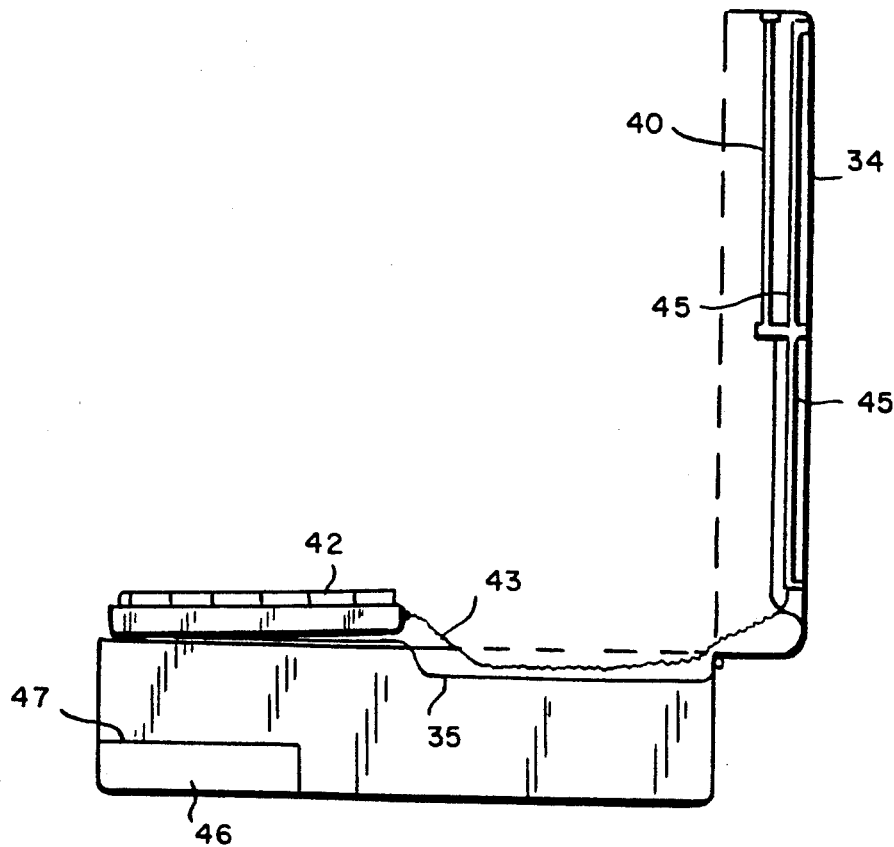
FIG. 7 is a side view of the brief case of FIG. 6 illustrating the arrangement of computer components with the compartment open for operation of the computer.

FIG. 5 shows the arrangement of computer components in brief case 30. In the upper compartment behind divider 35 is a conventional size screen 40, a conventional size keyboard, and a motherboard 45 located behind the divider 35 and the screen 40 and inside the outer panel 34 of the brief case. In the bottom portion of the brief case, a compartment 46 protected by an enclosure 47 houses the power supply and at least one disk drive. Opening 39 in the brief case is provided for floppy disks, if a floppy disk drive is utilized.

The source of power is preferably a battery or batteries (not shown) with a connector for recharging or running the computer on 110 V a.c. Location of the power supply and disk drive in compartment 46 provide stability for the brief case when the computer is being operated.

To use the computer, the hinged divider 35 is lowered to cover the bottom portion of the brief case and the keyboard 42 is moved from the recess 36 in the divider to the front of the brief case (FIG. 6) for use. The keyboard 42 may also be removed completely from the brief case for use. Thus, the brief case is in the open position showing the video screen 40 and ready for operation of the computer. Cable 43 connects the keyboard 42 to the computer motherboard 45.

Preferably, the brief case computer 30 has two disk drives located in compartment 46. A hard disk drive (not shown) and a floppy disk drive (not shown) which is accessed through opening 39. Opening 39 preferably has a movable protective cover to protect the opening when not being used.

Figure 8:
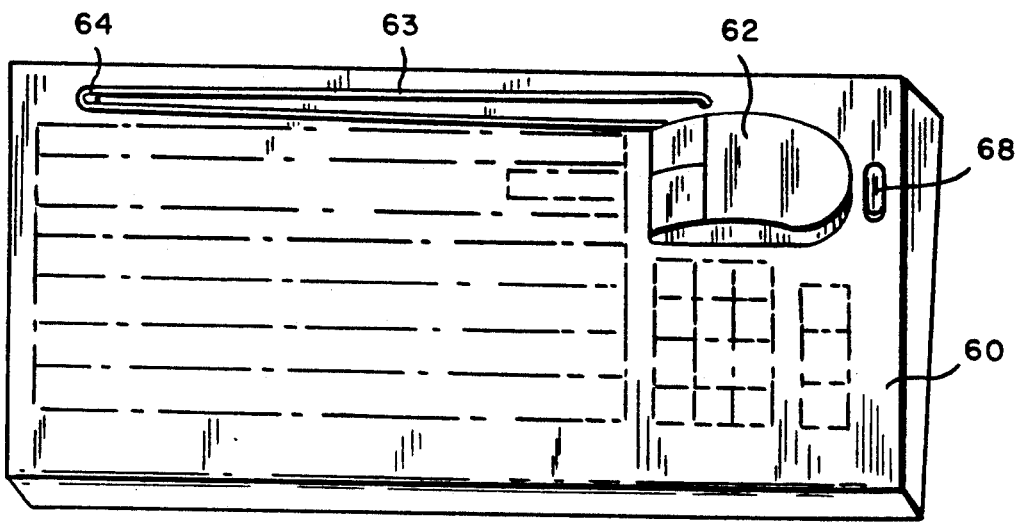
FIG. 8 is a perspective view of a preferred keyboard having a mouse as an integral component.
Figure 9:
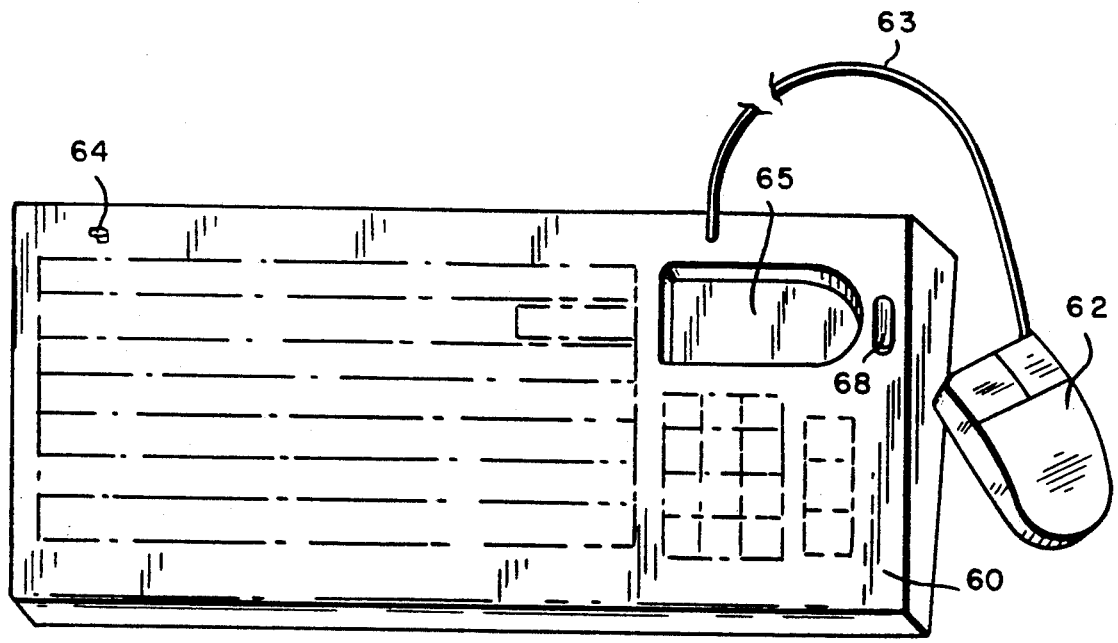
FIG. 9 is another perspective view of the keyboard of FIG. 8 showing the mouse removed from its locked position on the keyboard.

A preferred keyboard having a mouse as an integral component is illustrated in FIG. 8 and FIG. 9. The keyboard 60 has 84 keys (and possibly more) and three indicators, and an integral mouse 62. the mouse 62 is releasably located in a recess 65 in the keyboard 60 and released by button 68. The mouse cable 63 is conveniently held in place by hook 64 when the mouse is stored.

Most preferably, input/output (I/O) ports are suitably located on the side of the brief case for transferring data to and from other machines, e.g., other computers or printers, etc. Such ports, as well as an a.c. power connection, can be readily provided by the skilled mechanic. All computer components used in the practice of this invention are those that are available conventionally when assembling the brief case. However, particularly designed components can be used to provide maximum available space for conventional brief case articles.

Upon consideration of the specification and drawings, those skilled in the art may make modifications and/or improvements within the spirit and scope of the present invention which is defined by the claims.

What is claimed is:

1. A brief case containing as a part thereof a functional computer, the brief case (A) having a first compartment containing space for carrying items including documents, tablets, business articles, small books, and conventional brief case articles, (B) having fixedly positioned in said brief case and physically separated from said first compartment computer components including a computer motherboard, a disk drive and a power supply, and (C) having a video screen and (D) having a movably mounted keyboard, wherein the video screen and the keyboard are each positioned adjacent a panel of the brief case, wherein the computer components, the keyboard and the video screen are connected to provide a functional computer.

2. The brief case of claim 1, further comprising a protected compartment wherein the disk drive and power supply are positioned, the compartment being arranged and located within the brief case to provide stability when the computer is being used.

3. The brief case of claim 1, wherein the computer components include a hard disk drive.

4. The brief case of claim 1, wherein the computer components include a floppy disk drive and the brief case has an opening through its outer shell for inserting and removing disks from the drive.

5. The brief case of claim 1 wherein the computer components include a floppy disk drive and the brief case has an opening inside the case through which disks can be inserted and removed from the floppy disk drive.

6. The brief case of claim 1, wherein the keyboard includes a mouse as an integral component.

7. A brief case containing a computer as a part thereof, the brief case comprising: two large panels spaced apart and connected by four side walls to define an outer shell and an enclosed space; and computer components located and arranged in the brief case to have a functioning computer and to have a substantial portion of the enclosed space available for storage and carrying of conventional brief case items;

the computer components comprising a motherboard interconnected with a video screen, a keyboard, a disk drive and a power supply;

the motherboard including a processing unit, memory, a disk controller, a video controller and an input/output port;

one panel of the brief case having an opening into which the keyboard can be removably inserted and stored with the keyboard and panel forming an exterior surface of the brief case;

the video screen being positioned and arranged adjacent to the opening in the panel so that the screen can be viewed through the opening when the keyboard is removed from the opening to use the computer;

the power supply and disk drive being positioned and arranged in a protected compartment adjacent a side wall of the brief case to provide stability of the brief case when the computer is being used.

8. The brief case of claim 7, further comprising a divider positioned substantially parallel to the panel having the opening and spaced from the panel to protect the video screen and motherboard from contents of brief case that are carried in the remaining enclosed space.

9. The brief case of claim 7 having a hard disk drive.

10. The brief case of claim 7 having a floppy disk drive and an opening in a side wall through which a floppy disk can be inserted and removed.

11. The brief case of claim 10, further having a hard disk located adjacent to the floppy disk in the protected compartment.

12. The brief case of claim 7 wherein the computer components include a floppy disk drive and the brief case has an opening inside the case through which disks can be inserted and removed from the floppy disk drive.

13. The brief case of claim 7, wherein the keyboard includes a mouse as an integral component.

14. A brief case containing a computer as a part thereof, the brief case comprising: two large panels spaced apart and connected by four side walls to define an outer shell and an enclosed space; and computer components positioned and arranged in the brief case to have a functioning computer and to have a substantial portion of the enclosed space available for storage and carrying of conventional brief case articles; the brief case shell comprising two parts hinged together for opening and closing the brief case to access the enclosed space; one part of the shell forming a bottom portion of the brief case and the other part of the shell forming a top portion of the brief case; the brief case, when in the open position having the bottom portion supported on a surface, having the top portion positioned substantially vertical;

the computer components comprising a motherboard interconnected with a video screen, a keyboard, a disk drive and a power supply;

the motherboard including a processing unit, memory, a disk controller, a video controller and an input/output port;

the top portion of the shell having the video screen positioned adjacent the top panel to be viewed when the brief case is opened and having the motherboard positioned adjacent to the top panel;

the brief case further comprising a divider that can be closed to conceal the video screen and protect it from loose contents of the brief case;

the power supply and disk drive being positioned and arranged in a protected compartment in the bottom portion of the shell adjacent the side wall opposite the hinge to provide stability of the brief case when opened.

15. The brief case of claim 14, wherein the divider is adapted and arranged to removably hold the keyboard in the top portion of the brief case adjacent the top panel and to form a shelf covering the bottom portion of the brief case when in the open position for use of the computer.

16. The brief case of claim 14 having a hard disk drive.

17. The brief case of claim 14 having a floppy disk drive and an opening in a side wall for insertion and removal of a floppy disk from the drive.

18. The brief case of claim 17 having a hard disk drive located adjacent the floppy disk drive in the protected compartment.

19. The brief case of claim 14 wherein the computer components include a floppy disk drive and the brief case has an opening inside the case through which disks can be inserted and removed from the floppy disk drive.

20. The brief case of claim 14, wherein the keyboard includes a mouse as an integral component.

* * * * *